United States Patent
Mundt et al.

(10) Patent No.: US 8,353,996 B2
(45) Date of Patent: Jan. 15, 2013

(54) SYSTEM AND METHOD FOR MANUFACTURE OF INFORMATION HANDLING SYSTEM LAMINATED HOUSINGS

(75) Inventors: Kevin Mundt, Austin, TX (US); Ernesto Ramirez, Austin, TX (US); John Bauer, Austin, TX (US); James Slagle, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 284 days.

(21) Appl. No.: 12/763,628

(22) Filed: Apr. 20, 2010

(65) Prior Publication Data

US 2011/0256327 A1    Oct. 20, 2011

(51) Int. Cl.
  *B29C 47/02* (2006.01)
  *B29C 45/14* (2006.01)
(52) U.S. Cl. ......... 156/245; 156/228; 264/252; 264/263
(58) Field of Classification Search ............... 264/263; 156/252, 248
  See application file for complete search history.

(56) References Cited

U.S. PATENT DOCUMENTS

| | | | | |
|---|---|---|---|---|
| 3,058,160 A | * | 10/1962 | Mocker et al. | 264/292 |
| 4,785,523 A | * | 11/1988 | Koseki et al. | 29/530 |
| 5,409,290 A | * | 4/1995 | Grimm et al. | 296/215 |
| 6,235,408 B1 | | 5/2001 | Tamura et al. | |
| 6,334,972 B1 | * | 1/2002 | Kim | 264/263 |
| 6,437,238 B1 | | 8/2002 | Annerino et al. | |
| 7,199,029 B2 | | 4/2007 | Conley, Jr. | |
| 2009/0202840 A1 | * | 8/2009 | Griebel et al. | 428/423.1 |
| 2010/0075719 A1 | * | 3/2010 | Tomioka et al. | 455/566 |

FOREIGN PATENT DOCUMENTS

| | | | | |
|---|---|---|---|---|
| JP | 62199414 A | * | 9/1987 | |
| JP | 01310923 A | * | 12/1989 | |
| JP | 02258320 A | * | 10/1990 | |
| JP | 03236922 A | * | 10/1991 | |
| JP | 11298158 A | * | 10/1999 | |
| WO | WO 2007137850 A1 | * | 12/2007 | |

* cited by examiner

*Primary Examiner* — William Bell
(74) *Attorney, Agent, or Firm* — Hamilton & Terrile, LLP; Robert W. Holland

(57) ABSTRACT

An information handling system housing is manufactured from a laminate material having a stainless steel exterior and magnesium interior that are encapsulated with injection molding. A thin sheet of stainless steel is formed to have a lip that meets against the magnesium and is secured in place with injection molding material. In one embodiment, an injection molding tool holds the laminate material in place to encapsulate the perimeter of the material with injection molding material and also activates an adhesive that holds the laminate material together, such as by applying pressure and heat to the laminate material.

15 Claims, 4 Drawing Sheets

SYSTEM AND METHOD FOR MANUFACTURE OF INFORMATION HANDLING SYSTEM LAMINATED HOUSINGS

BACKGROUND OF THE INVENTION

1. Field of the Invention

The present invention relates in general to the field of information handling system portable housings, and more particularly to a system and method for manufacture of information handling system laminated housings.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems present an attractive option to many end users. A portable information handling system generally includes integrated I/O devices and an integrated power source so that the system operates without physical wire connections, such as a power cable to an external power source or peripheral cables to external I/O devices. For example, one common configuration used in portable information handling system housings is a clamshell configuration in which a lid rotationally couples to a chassis, the lid integrating a display that closes over top of a keyboard disposed in the chassis. The chassis contains a rechargeable battery that powers processing components disposed within the chassis. During portable operations, an end user rotates the lid to an open position to expose the display and keyboard and runs the processing components on power provided from the battery. When not operating, the system closes into a compact footprint easily transported by an end user.

Design and manufacture of portable information handling system housings present a number of challenges. One concern is providing a housing that has adequate strength with minimal weight. Another concern is providing a housing that prevents excessive heat transfer from internal components to the housing outer surface such that the surface is not comfortable to an end user's touch. Another concern is providing shielding from electromagnetic interference (EMI) generated by components within the housing. In addition to such practical concerns, end users also desire housings that have an attractive and durable appearance. One material option for a portable housing is stainless steel because it is a robust material with good strength and hardness. Although stainless steel provides an aesthetically pleasing and durable housing with good EMI shielding, the material is somewhat heavier than other options and thus tends to result in housings that are less portable. Another material option is die cast magnesium housing portions. Magnesium housings weigh less than similar-sized steel housings and have relatively good stiffness, however, the cast magnesium has a rough appearance that typically needs mechanical touch-up and paint in order to have aesthetically acceptable appearance. Non-metal materials are available that have reduced weight relative to metal materials, however, non-metal materials tend to be less robust than metal materials and tend to need metal shielding to contain EMI. As processing components have become more compact and powerful, manufacturers have attempted to reduce portable housing size and thickness, such as by using thinner materials. Currently-used materials do not offer much in the way of additional size reduction to minimize weight without sacrificing the robustness of the housing.

SUMMARY OF THE INVENTION

Therefore a need has arisen for a system and method which provide a portable information handling system housing that is adequately robust, stiff and hard to provide an aesthetically-pleasing durable enclosure.

In accordance with the present invention, a system and method are provided which substantially reduce the disadvantages and problems associated with previous methods and systems for manufacture of an information handling system housing. Plural materials form a laminate material having at least a portion of its perimeter encapsulated with injection molding. In one embodiment, manufacture of the housing is performed by near simultaneous activation of laminate adhesive and injection molding. The adhesive is activated while the laminate materials are disposed within an injection molding tool so that the lamination and injection molding are supported by one iteration of closing the injection molding tool.

More specifically, an information handling system is built by lamination of inner and outer materials with the inner material providing low weight structural support, such as with magnesium, and the outer material providing stiffness and an aesthetically-pleasing appearance, such as with a thin sheet of stainless steel. The outer material is formed with a lip along its perimeter that meets against the inner material and contains an intermediate filler material, such as paper or fiberboard or plastic. A high shear adhesive applied to the intermediate filler material glues the inner and outer materials to the filler material to form a laminate material. The perimeter of the laminate material has injection molding material, such as thermoplastic, formed around at least a portion of the lip to encapsulate the laminate material where the outer edge of the outer material would otherwise be exposed. Encapsulation of the outer perimeter of the laminate material helps to maintain the structural integrity of the material and prevents end user contact with the edge of the material used to create the laminate. In one embodiment, activation of adhesive in the laminate is performed during the injection molding process, such as by heating or compressing the laminate materials with an activation temperature or pressure when the laminate materials are disposed in an injection molding tool. Insert injection molding is performed with one iteration of the injection molding tool from insertion of the laminate materials with the injection molding tool open, activation of the adhesive and insertion injection molding with the injection molding tool closed, and release of a completed housing portion when the injection molding tool opens.

The present invention provides a number of important technical advantages. One example of an important technical advantage is that a portable information handling system has a hard stainless steel outer material layer that has a durable and scratch resistant surface and a light weight inner material layer that provides improved stiffness with a less thick and heavy construction. Injection molding of an outer perimeter provides aesthetically-pleasing molded details while providing additional security by integrating the stainless steel outer material layer with inner material layers. An inner material layer of die cast magnesium provides stiffness and shielding with minimal weight while being hidden from view by the outer stainless steel layer and injection molding finish. The extra expense of mechanically treating and painting a die cast magnesium exterior is avoided. Adhesion of the material layers of the housing is accomplished in the same step as injection molding by providing heat, pressure and other factors as needed to the material while the material is held in place for the injection molding process. Manufacturing time and complexity for a composite housing of multiple material layers are minimized, reducing assembly time, tooling costs and total part costs.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system housing built from an encapsulated laminated material provides a sturdy structure with reduced size and weight. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
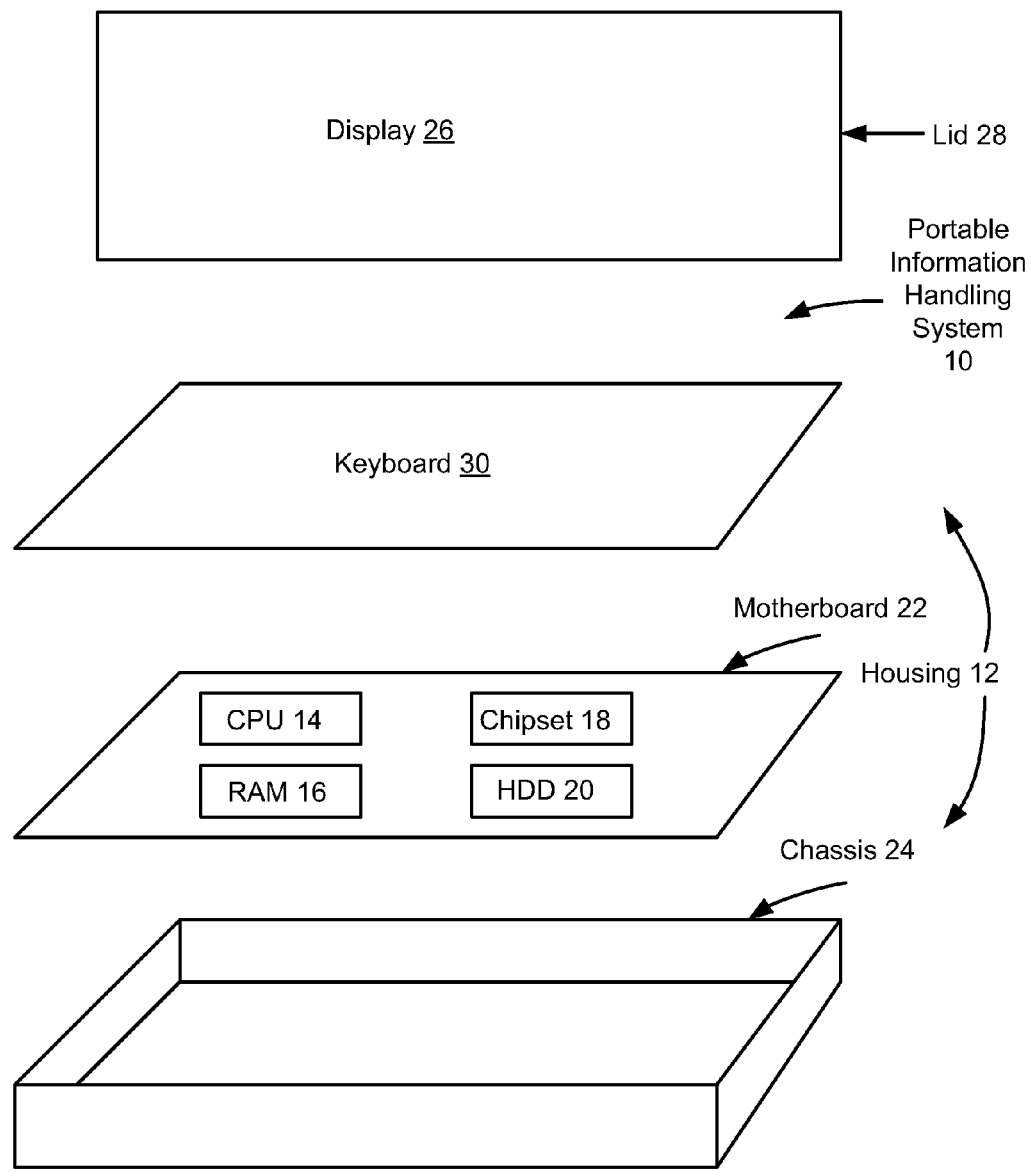
FIG. 1 depicts a blown-up view of a portable information handling system.

Referring now to FIG. 1, a blown-up view depicts a portable information handling system 10. Information handling system 10 has plural components disposed in a housing 12 that cooperate to process information, such as a CPU 14, RAM 16, a chipset 18 and a hard disk drive 20. The components communicate through a motherboard 22 supported within a chassis 24 portion of housing 12. A display 26 integrates in a lid 28 portion of housing 12 to present information processed by the components disposed in chassis 24. A keyboard 30 assembles over the top of motherboard 22 to accept end user inputs and cover the processing components within the interior of chassis 24. During normal operations, lid 28 rotates relative to chassis 24 to an open position to expose keyboard 30 and display 26. When powered down, lid 28 rotates relative to chassis 24 to a closed position with display 26 proximate to keyboard 30 so that the system is easily transported or stored. The assembly of display 26 in lid 28 and of keyboard 30 over chassis 24 generally ensures that interior portions of chassis 24 and lid 28 are hidden from end user view after assembly of a portable information handling system within a housing 12. Exterior portions of lid 28 and chassis 24 are visible in open and closed positions, and face the risk of damage from impacts made at housing 12.

Figure 2:
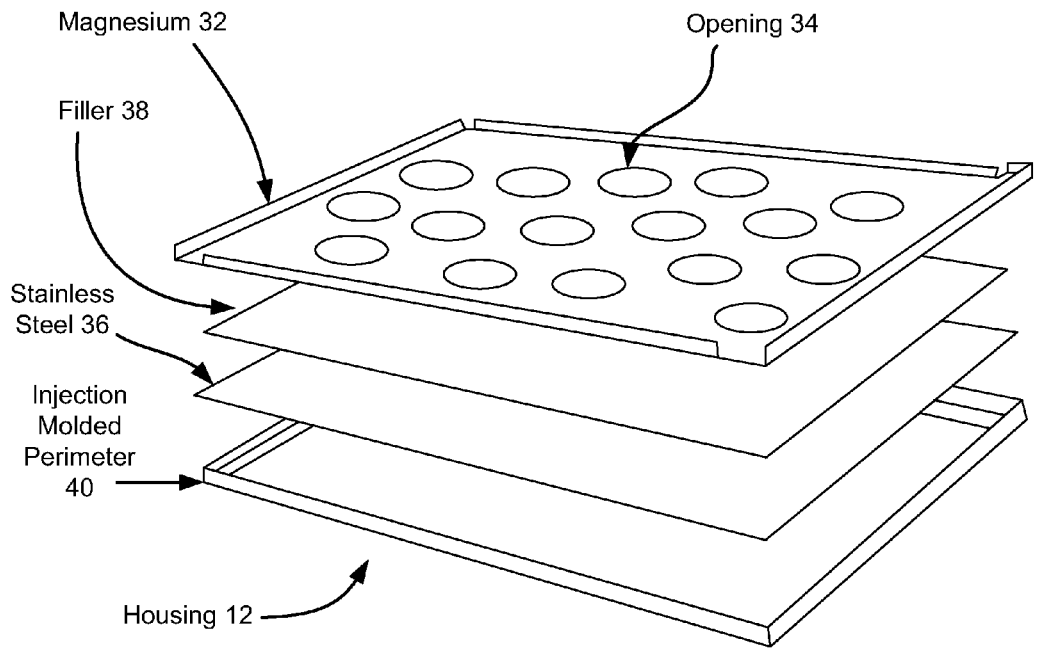
FIG. 2 depicts a blown-up view of a portion of a portable information handling system housing made from an encapsulated laminated material.

Referring now to FIG. 2, a blown-up view depicts a portion of a portable information handling system housing 12 made from an encapsulated laminated material. A piece of sheet metal magnesium material 32 is formed to a shape desired for the interior of the housing. In order to minimize housing weight, magnesium material 32 has openings 34 formed in it, with the opening sizes adjusted to provide a desired overall weight and strength based upon the thickness of the magnesium and the weight and strength of other materials used in the laminate. A sheet of stainless steel material 36 is formed to a shape desired for the exterior surface of the housing. For example, stainless steel 36 is formed as a shallow drawn pan to have a lip along a portion of its outer perimeter. A filler material 38 is disposed between magnesium 32 and stainless steel 36. For example, filler material 38 is plastic, honeycomb material, perforated material, paper, or fiberboard having a specific gravity of 0.8. Filler material 38 is exposed at openings 34 of magnesium 32. An injection molded perimeter material 40 surrounds and encapsulates the perimeter of magnesium 32 and stainless steel 36. For example, plastic material is insert injection molded around the perimeter of magnesium 32 and stainless steel 36 after the materials are laminated together by an adhesive. Injection molded perimeter material 40 captures the edges of magnesium 32 and stainless steel 36 to maintain the laminated materials as a solid piece and to protect end users from sharp edges that might occur around the perimeter of the laminated materials. The encapsulated laminated housing material provides 70% greater stiffness than a magnesium housing, provides good shielding from EMI emissions and provides reduced thermal transfer relative to metal-only housing materials.

Figure 3:
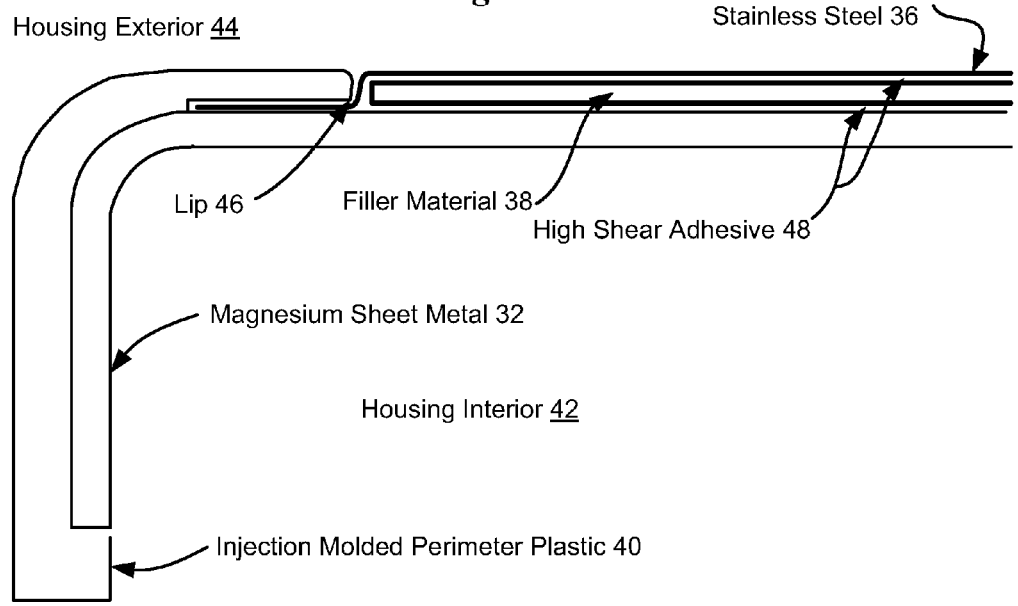
FIG. 3 depicts a side cutaway view of a portion of housing 12 having an encapsulated laminated material.

Referring now to FIG. 3, a side cutaway view depicts a portion of housing 12 having an encapsulated laminated material. At an interior portion 42, magnesium 32 has a desired shape for housing 12. Interior portion 42 is generally hidden from view after assembly of an information handling system in housing 12. At an exterior portion 44, stainless steel 36 is disposed to present an aesthetically pleasing outer surface of housing 12. Stainless steel 36 has a lip 46 formed at its outer perimeter so that stainless steel 36 and magnesium 32 are disposed proximate to each other along the perimeter and so that filler material 38 has room between stainless steel 36 and magnesium 32 within the housing. For example, stainless steel 36 has a thickness of approximately 0.1 mm, magnesium 32 has a thickness of approximately 0.5 mm, and filler material 38 has a thickness of 0.5 mm. Injection molded material 40 encapsulates the intersection of magnesium 32 and stainless steel 36, including lip 46, to capture the laminate materials in place and to protect end users from potentially sharp edges, such as might exist at the out perimeter of lip 46 where a relatively thin edge of stainless steel would otherwise be exposed. A high sheer adhesive 48 disposed on each side of filler material 38 glues stainless steel 36 and magnesium 32 to filler material 38 to form a laminate material.

Figure 4:
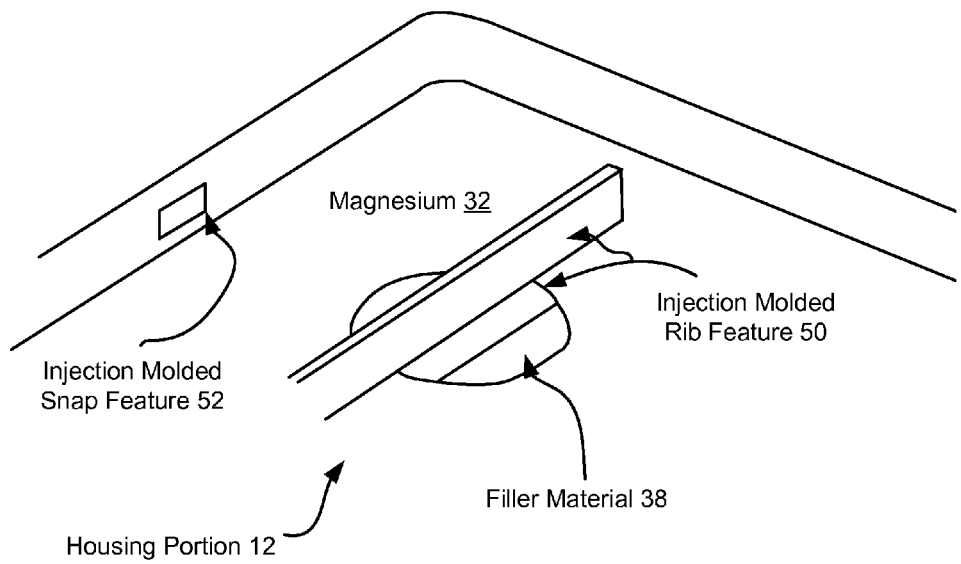
FIG. 4 depicts an upper perspective view of an interior portion of a housing having features formed within the housing.

Referring now to FIG. 4, an upper perspective view of an interior portion of housing 12 depicts features formed within housing 12. At the interior of housing 12, magnesium 32 is exposed with openings 34 that expose filler material 38 disposed within the laminate material. Injection molding material 40, such as insert injection molded thermoplastic, encapsulates the perimeter of housing 12 to capture the edge of magnesium 32 and other laminated materials exposed along the perimeter of housing 12. In addition, insert injection molding builds features within housing 12 by bonding material to filler 38 exposed at openings 34 of magnesium 32. For example, a rib feature 50 is injection molded at the same time as perimeter 40. Rib feature 50 provides support for components disposed within housing 12, such as a display or hard disk drive. Another example of a feature included during injection molding is a snap feature 52 formed in an opening of magnesium 32, such as a snap feature to accept an external cable at a port of an assembled information handling system. Snap feature 52 integrates with injection molding perimeter 40 to provide bonding around the opening of magnesium 32 without the presence of filler material 38. Other types of features added to housing 12 during injection molding include snap features, undercuts, connector openings and mounting features. Thus, in addition to reducing overall housing weight, openings 34 formed in magnesium 32 provide improved bonding within the interior of housing 12 by exposing filler material 38, which has better injection molding bonding qualities than magnesium 32.

Figure 5:
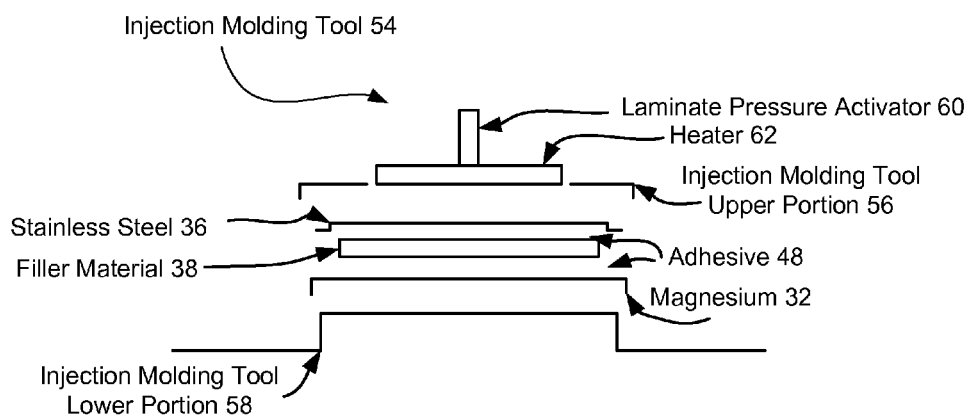
FIG. 5 depicts a side cutaway view of laminate materials disposed in an injection molding tool for performing an encapsulation and lamination combined process.

Referring now to FIG. 5, a side cutaway view depicts laminate materials disposed in an injection molding tool 54 for performing an encapsulation and lamination combined process. The laminate materials depicted by FIG. 5 include stainless steel 36, filler material 38 and magnesium 32 that are laminated together by a high sheer adhesive 48. In alternative embodiments, alternative materials may be used form the laminate, such as aluminum, steel or other metals conventionally used in information handling system housings. Injection molding tool 54 is configured to combine an injection molding process and lamination process in a single tool closing iteration. An upper injection molding tool portion 56 closes relative to a lower injection molding tool portion 58 in a conventional manner to define an area around the compressed laminate materials that will accept injection molding material. However, because injection molding compression exceeds the pressure typically used for compressing laminate materials during activation of adhesive 48, a separate laminate pressure activation device 60 provides compression to the laminate materials during the lamination process that has a lower pressure relative to the pressure applied by the injection molding tool 54. In addition to applying lamination pressure, activation device 60 includes a heater 62 that provides heat to the laminate materials at a temperature associated with activation of adhesive 48. For example, heater 62 provides heat at a temperature in excess of that typically used during injection molding, but isolates the heat to the laminate materials for activation of adhesive 48 without interfering with the injection molding process. In one embodiment, activation device 60 is spring-loaded so that injection molding pressure at the perimeter of the laminate material is approximately 500 tons while adhesive activation pressure applied with spring-loading is approximately 150 PSI. Spring loading allows both adhesive activation and injection molding with a single closing movement of the tool. Further, providing heat through the spring-loaded device achieves an adhesion temperature at the inner area of the laminate materials while allowing an injection molding temperature at the outer perimeter of the injection molding materials.

Figure 6:
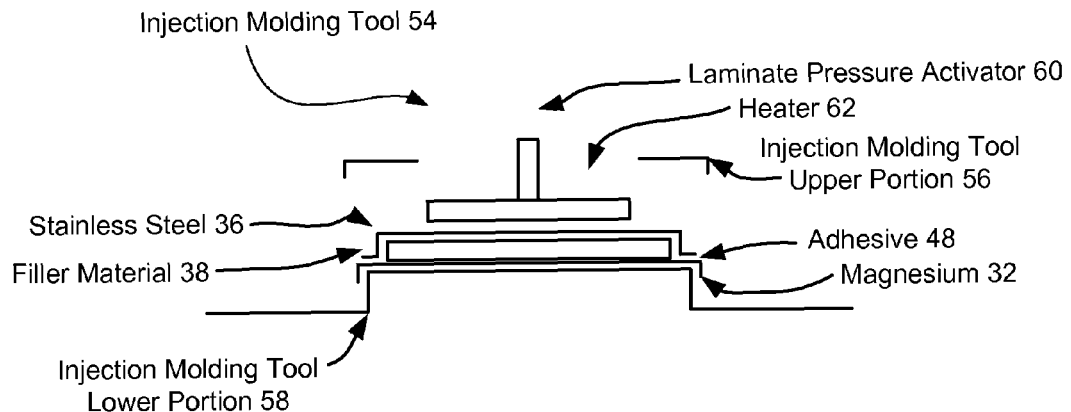
FIG. 6 depicts a side cutaway view of an injection molding tool having an integrated activation device positioned to activate adhesive between the laminate materials.
Figure 7:
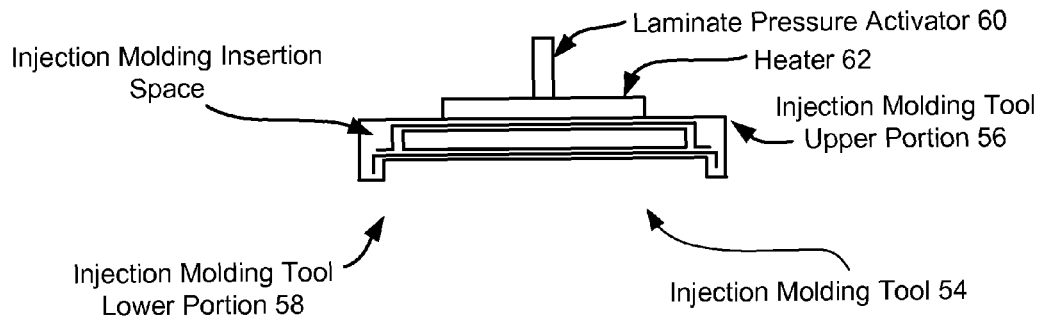
FIG. 7 depicts a side cutaway view of the injection molding tool having the integrated activation device withdrawn from the laminate materials to allow compression for insert injection molding.

Referring now to FIG. 6, a side cutaway view depicts injection molding tool 54 having an integrated activation device 60 positioned to activate adhesive between the laminate materials. Portions 56 and 58 of injection molding tool close relative to each other to align the laminate materials without applying substantial pressure to the laminate materials. Laminate pressure activation device 60 presses downward on the laminate materials to provide a pressure associated with activation of adhesive 48 and heater 62 provides thermal energy to the laminate materials that bring the adhesive to its activation temperature. As an example, heater 62 may be suspended using a rubber pack available with injection molding tools, a spring plate, a reverse injection plate or hydraulic activation. Heater 62 is, for example, a cartridge heater combined with a beryllium copper heat plate that provides an adhesive activation temperature of greater that the approximately 140 degrees F. used during injection molding. In one embodiment, a ceramic insulator helps to isolate heater 62 from the primary surfaces of injection molding tool 54. After activation of the adhesive, laminate pressure activation device 60 withdraws into upper injection molding tool 56, and upper and lower portions of injection molding tool 54 press together to provide pressure associated with the injection molding process. Once portions 56 and 58 of injection molding tool 54 define the area for insertion of injection molding material as depicted by FIG. 7, injection molding material is insertion injection molded to encapsulate the perimeter of the laminated materials and then the tool opens to release the completed housing portion. Thus, one closing iteration of injection molding tool 54 supports both activation of adhesive to laminate materials and injection molding of material around the perimeter of the laminated materials and as features attached to the laminated materials. In alternative embodiments, alternative adhesive activation devices may be integrated within an injection molding tool, such as ultraviolet, humidity, two part adhesive and pressure activation Although the present invention has been described in detail, it should be understood that various changes, substitutions and alterations can be made hereto without departing from the spirit and scope of the invention as defined by the appended claims.

What is claimed is:
1. A method for manufacture of a laminate from plural materials, the method comprising:
 disposing a first material in a first tool portion;
 disposing a second material in a second tool portion;
 disposing adhesive between the first and second materials;

closing the first and second tool portions to a closed position to bring the first and second materials proximate to each other;
activating the adhesive with the tool portions in the closed position;
injection molding an injection molding material to the tool portions for bonding to at least one of the materials;
forming openings in the second material;
disposing a filler material between the first and second materials, the filler material exposed at the openings; and
injection molding the injection molding material at the second material by bonding the injection molding material to the filler material exposed at the openings.

2. The method of claim 1 further comprising maintaining the tool portions in the closed position until completion of both the activating and the injection molding.

3. The method claim 1 wherein activating comprises heating the first and second materials to a first temperature associated with activating the adhesive, and injection molding comprises heating the perimeter of the first and second materials to a second temperature associated with injection molding.

4. The method of claim 1 wherein activating comprises compressing the first and second materials at a first pressure to activate the adhesive and injection molding comprises compressing the perimeter of the first and second materials at a second pressure to support injection molding.

5. The method of claim 1 wherein injection molding further comprises injection molding of injection molding material to encapsulate at least a portion of a perimeter where the first and second materials meet.

6. The method of claim 5 wherein the portion of the perimeter comprises a lip formed in at least one of the materials.

7. The method of claim 1 wherein the second material comprises magnesium.

8. The method of claim 7 wherein the first material comprises stainless steel.

9. A method for manufacture of a laminate, the method comprising:
putting stainless steel and magnesium in a tool, the magnesium having one or more openings;
disposing a filler material between at least some portion of the stainless steel and magnesium, the filler material exposed at the one or more openings;
injection molding an injection molding material to the tool for bonding to at least the magnesium and the filler material exposed at the one or more openings; and
encapsulating the second material, the first material and the filler material with the injection molding material at the one or more openings.

10. A method for manufacture of a laminate, the method comprising:
putting first and second materials in a tool, the second material having one or more openings;
disposing a filler material between at least some portion of the first and second materials, the filler material exposed at the one or more openings;
injection molding an injection molding material to the tool for bonding to at least the second material and the filler material exposed at the one or more openings; and
activating an adhesive disposed between the first material and the second material by compressing the first and second materials at a first pressure;
wherein injection molding further comprises compressing the first and second materials at a second pressure different from the first pressure.

11. The method of claim 10 wherein activating comprises compressing the first and second materials at a first pressure to activate the adhesive and injection molding comprises compressing the perimeter of the first and second materials at a second pressure to support injection molding.

12. The method of claim 11 wherein the tool has at least first and second portions enclosing at least a portion of the first material and at least a portion of the second material, and wherein the tool first and second portions remain coupled together without decoupling for both the activating and the injection molding.

13. A method for manufacture of a laminate, the method comprising:
putting first and second materials in a tool, the second material having one or more openings;
disposing a filler material between at least some portion of the first and second materials, the filler material exposed at the one or more openings; and
injection molding an injection molding material to the tool for bonding to at least the second material and the filler material exposed at the one or more openings;
wherein the first and second materials form a portion of an information handling system housing.

14. A method for manufacture of a laminate, the method comprising:
putting first and second materials in a tool, the second material having one or more openings;
disposing a filler material between at least some portion of the first and second materials, the filler material exposed at the one or more openings;
injection molding an injection molding material to the tool for bonding to at least the second material and the filler material exposed at the one or more openings; and
spring loading pressure against the tool to provide a first pressure for activating an adhesive disposed in the tool with the first and second materials and a second pressure different from the first pressure during the injection molding.

15. The method of claim 14 wherein the first and second pressures are provided with a single closing operation of the tool.

* * * * *